United States Patent [19]

Simborski

[11] Patent Number: 4,603,499
[45] Date of Patent: Aug. 5, 1986

[54] HORIZONTAL FISHING ROD MOTION CONTROL

[76] Inventor: Anthony Simborski, 14140 Germanium St. NW., Anoka, Minn. 55303

[21] Appl. No.: 750,926

[22] Filed: Jul. 1, 1985

[51] Int. Cl.⁴ .......................................... A01K 97/10
[52] U.S. Cl. ........................................ 43/19.2; 43/21.2
[58] Field of Search ................. 43/15, 19.2, 21.2, 25, 43/26.1

[56] References Cited

U.S. PATENT DOCUMENTS

| | | | |
|---|---|---|---|
| 3,389,489 | 6/1968 | Burns | 43/21.2 |
| 3,459,387 | 8/1969 | Miyamae | |
| 3,665,633 | 5/1972 | Scott | 43/19.2 |
| 3,835,568 | 9/1974 | Whitfield | 43/21.2 |
| 3,839,810 | 10/1974 | Lagasse | 43/19.2 |
| 3,975,854 | 8/1976 | Graham | 43/19.2 |
| 4,100,695 | 7/1978 | Blanchard | 43/19.2 |
| 4,251,939 | 2/1981 | Tiede | 43/19.2 |
| 4,274,219 | 6/1981 | Way | |
| 4,517,760 | 5/1985 | Randle | |
| 4,517,761 | 5/1985 | Bleggi | |
| 4,520,682 | 6/1985 | Eitzinger | |

Primary Examiner—Nicholas P. Godici
Assistant Examiner—K. Rowan
Attorney, Agent, or Firm—Vidas & Arrett

[57] ABSTRACT

A motor driven trolling device for fishing which when mounted to a gunwale of a fishing boat provides automatic, powered trolling action to a fishing rod held in the device. The mechanism is attached to a gunwale by a specially configured frame which is rigidly locked to the boat. A motor drives a slider crank mechanism which causes an upstanding lever on the slider to move back and forth along a straight line parallel to the gunwale of the boat. The shaft of a fishing rod is held within a notch formed in the upstanding lever and the butt end of the fishing rod is held to a rod holder attached to the frame. As the slider of the slider crank mechanism moves back and forth, the free end of the fishing rod is moved back and forth thereby providing a powered trolling action. The stroke of the fishing rod may be varied by attaching the connecting rod of the slider crank mechansim to a different aperture of the driven crank. Suitable speed controls allow the speed of the trolling to vary as required for the fishing conditions.

11 Claims, 5 Drawing Figures

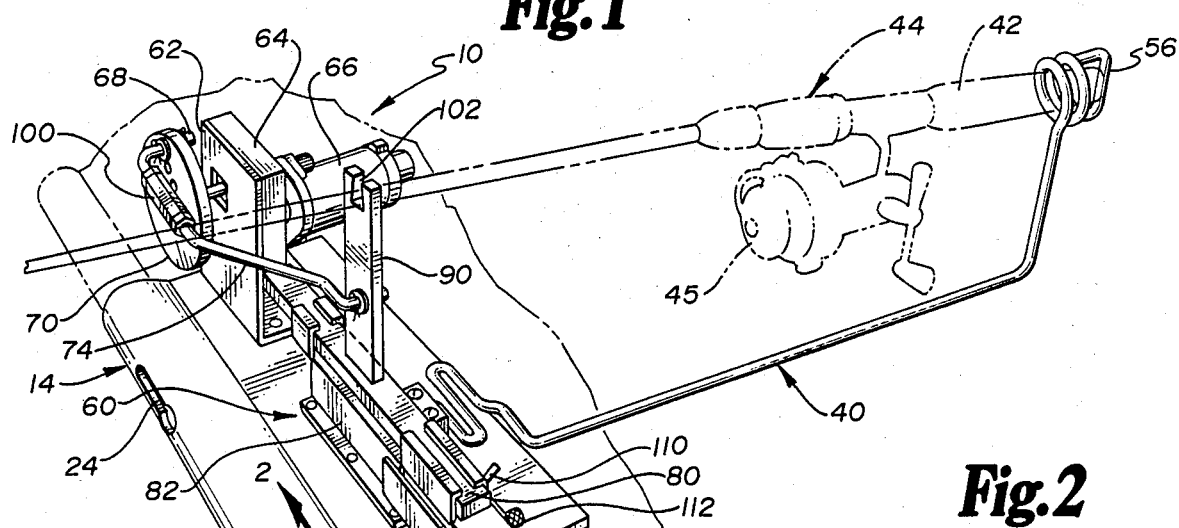

HORIZONTAL FISHING ROD MOTION CONTROL

DESCRIPTION

1. Field of the Invention

This invention relates to a fishing device to be attached to a boat. When combined with a fishing rod, it provides a powered trolling action by moving the fishing rod back and forth.

2. Background of the Invention

In trolling, a fisherman typically sits in a moving fishing boat having his fishing rod extending generally perpendicularly to the direction of the boat. The butt end of the fishing rod is usually held against the body of the fisherman. In order to provide action to the fishing tackle, the fisherman alternatively pulls the fishing rod toward the bow of the boat and releases the pull allowing the tackle to drag toward the stern of the boat. This repeated action may be very tiring and the portion of the body against which the fishing rod abuts may become quite sore.

It is, therefore, an object of this invention to provide a powered trolling device which readily attaches to the gunwale of a fishing boat and to which a fishing rod may be positioned. The powered trolling device simulates the normal trolling action created by the fisherman by securing the butt end of the fishing rod to the frame while moving the shaft of the rod back and forth relative to the direction of the boat.

It is a further object of the invention to provide a trolling mechanism which may be adjusted both as to the length of the stroke imparted to the fishing rod and the number of stroke cycles per unit of time.

It is a still further object of the invention to provide a means for holding the fishing rod which allows a user to quickly and readily remove the fishing rod from the mechanism when a fish strikes the tackle.

BRIEF SUMMARY OF THE INVENTION

The trolling device of the invention consists of a frame member which generally conforms to a typical gunwale of a fishing boat and which includes a generally horizontal surface to which the remainder of the trolling device is attached. A fishing rod holder extends generally perpendicularly from the frame and gunwale of the boat and includes a rod butt holder at its free end. In this manner, a fishing rod positioned within the holder extends outwardly over the gunwale of the boat toward the water.

In order to provide reciprocating, rectilinear motion of the fishing rod, a slider crank mechanism is utilized. The slider crank mechanism includes a crank driven by a motor and speed reducer which imparts rotational motion of the crank. The crank, in turn, is linked to a connecting rod of variable length. The other end of the connecting rod is linked to an upstanding lever member which is attached to a slider bar positioned within a slideway attached to the frame such that the slider bar is capable of guided linear motion.

A fishing rod is supported along its shaft within a notch cut within the top of the lever attached to the slider bar. The rectilinear motion of the slider bar and lever is transmitted to the shaft of the fishing pole which thereby simulates human powered trolling.

In order to adjust the length of the stroke of the slider and, therefore, the fishing rod, a number of apertures are provided on the crank such that the distance between the crank axis and the distance to the connecting rod may be varied. In slider crank mechanisms, the stroke of the slider is equal to approximately twice the length of the crank when the center line of the slideway passes through the pivot link. Therefore, the stroke may be varied by changing the crank length. The connecting rod preferably includes a turnbuckle or similar mechanism to vary its length such that when a different aperture is chosen on the crank, the center position of the upstanding lever is unchanged by merely altering the length of the connecting rod.

Preferably, the crank is driven by a motor which has a variable speed control such that the stroke cycle may be varied by an operator in accordance with the fishing conditions.

The trolling device may be quickly and readily attached to the gunwale of a boat by bolting the frame to the gunwale. The fishing rod holder may be quickly attached to or removed from the frame by the use of a cotter pin. The fishing rod positioned with its butt in the rod holder and its shaft in a notch cut in the upstanding lever may be quickly and easily removed from the device while power is on by merely lifting upwardly on the shaft while pulling the butt from the rod holder. Preferably, the rod holder includes an offset such that a depending reel on the rod does not engage the rod holder.

The trolling device of the invention frees an operator from the monotonous and laborious task of alternatively pulling and letting up on the fishing tackle while trolling. The device operates with all standard fishing rods and may be readily powered from the boats on board direct current 12-volt battery.

BRIEF DESCRIPTION OF THE DRAWINGS

The detailed description of the invention, including its preferred embodiment, is hereinafter described with specific reference being made to the drawings in which:

FIG. 1 is a perspective view of the trolling device with a fishing rod and part of a fishing boat gun whale shown in phantom line;

FIG. 2 is a rear elevational section taken along lines 2—2 of FIG. 1 showing the frame mounted to a stud on the handrail at shearwater;

FIG. 3 is a rear elevational view of the trolling device;

DETAILED DESCRIPTION OF THE INVENTION

Figure 4:
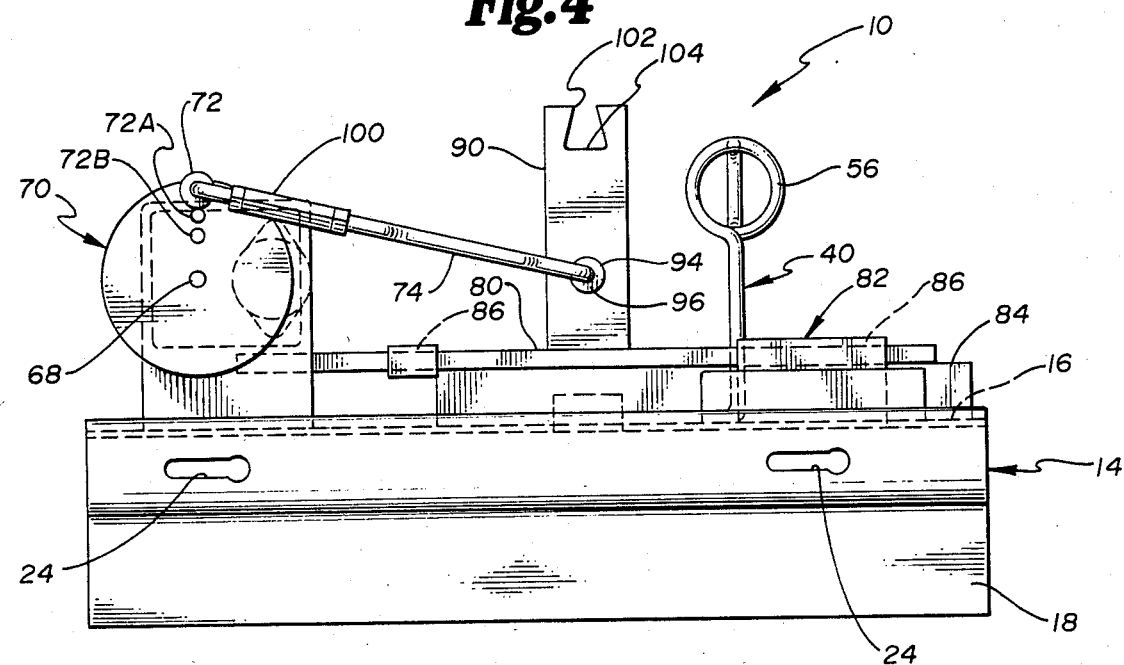
FIG. 4 is an outboard elevational view.

The trolling device 10 of the invention is best shown in FIGS. 1, 3, 4 and 5 and consists of a frame 14 including a generally horizontal portion 16 and a generally vertical portion 18 which preferably conforms to a gunwale 20 of a fishing boat.

Frame 14 may be attached to the gunwale of the boat permanently or temporarily. As shown in FIGS. 1 and 2, bolts 22 secured to gunwale 20 may fit through slots 24 in vertical portion 18 of the frame. Alternatively or additionally, a threaded bolt 26 having a rubber head 28, wing nut 30 and backup nut 32 may be utilized as shown in order to provide a firm foundation for the horizontal portion 16 of the frame 14.

Figure 5:
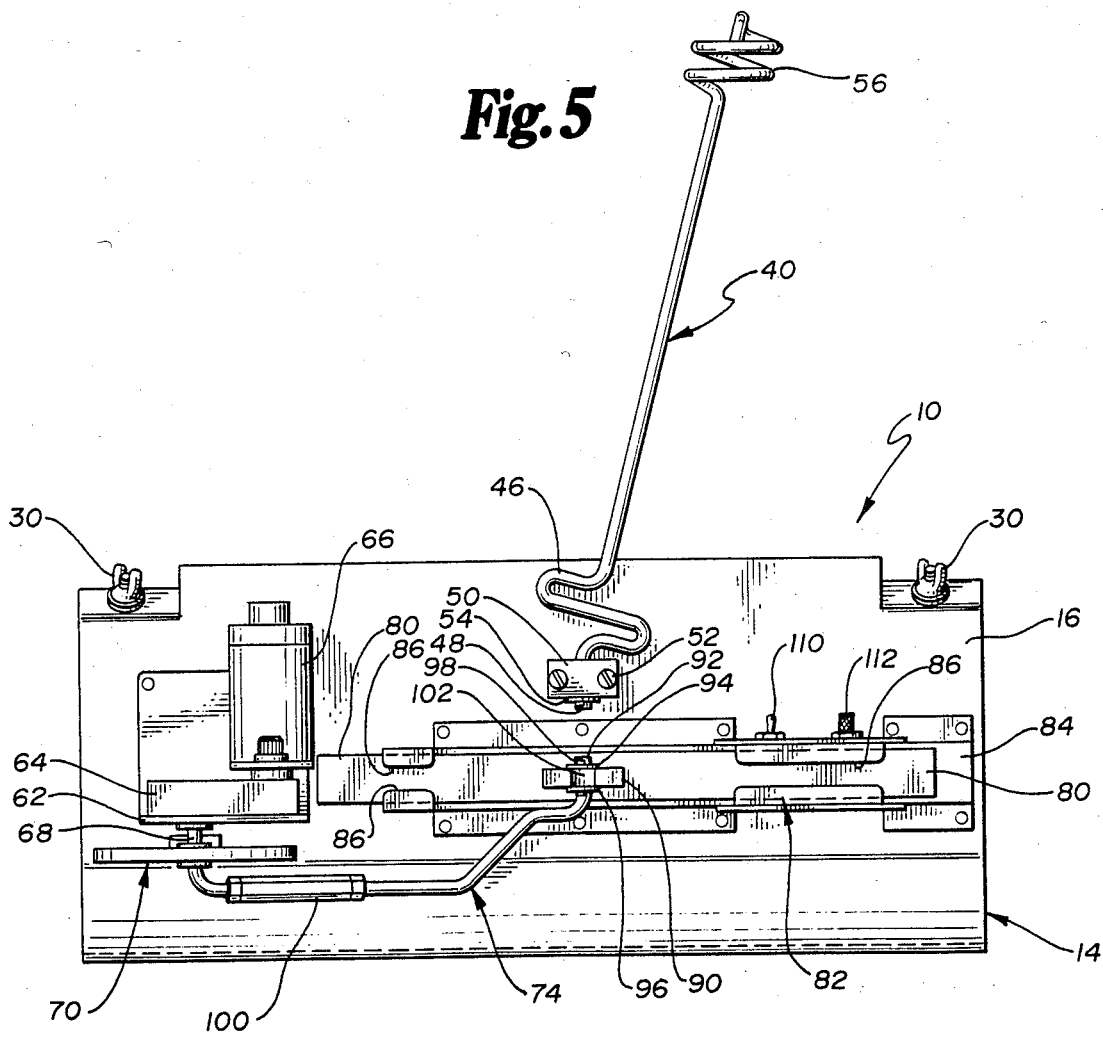
FIG. 5 is a top plan view.

Referring to FIGS. 1, 3 and 5 in particular, a rod holder 40 is shown which receives the butt end 42 of a fishing rod 44. Rod holder 40 extends generally perpendicularly from gunwale 20, as shown, toward the center of the fishing boat. As shown, rod holder 40 may include an S-shape loop 46 which rests on top of horizontal portion 16 in order to hold rod holder 40 in a fixed position. Rod holder 40, as shown, also includes end portion 48 which passes through a holder support 50 attached to frame 14 by screws 52. Rod holder 40 may be detachably held to the frame by inserting a cotter pins 54 through an opening in the end portion 48 of the holder. The end of the holder includes a rod butt holder 56. The rod butt holder 56 preferably is formed as a closed cup in order to cradle an end 42 of a fishing rod.

A slider crank mechanism 60 is mounted to the upper surface of horizontal portion 16. Mechanism 60 includes motor support frame 62 which is attached to frame 14 as shown. A motor speed reducer means 64 is mounted to frame 62 and reduces the speed of motor 66 which is also mounted thereto. Motor 66 supplies rotational movement to axle 68. Motor 66 is preferably a 12-volt DC motor such as Dayton GearMotor Model 4Z838 from Dayton Electrical Manufacturing Company of Chicago, Ill.

Axle 68, in turn, is connected to crank 70 which, in the form shown in the drawings, is a wheel. Crank wheel 70 includes at least one aperture 72 to which a connecting rod 74 may be linked. Preferably, crank wheel 70 includes additional apertures each at a different spacing from axle 68. As shown in the Figures, apertures 72A and 72B may alternatively be employed to provide an attachment point for connecting rod 74. Selection of an aperture closer to axle 68 results in a shorter crank length which decreases the stroke length possible in the slider crank mechanism 60.

A slider bar 80 is held within a slideway 82 as shown such that slider bar 80 is capable of guided linear motion within the slideway. Slideway 82 is in turn mounted to horizontal portion of frame 14. As shown, slideway 82 includes a smooth support surface 84 on which the slider bar 80 rests as well as arms 86 which partially surround slider bar 80 such that slider bar 80 may only move back and forth in the loosely fitting slideway. The slider bar 80 of the model made by the inventor was formed of a hard plastic. Slider bar 80 may be formed from any material and may include conventional bearings in order to decrease the friction between the slider bar and the slideway. Any slider bar—slideway arrangement as in conventional slider crank mechanisms may be employed so long as guided rectilinear movement of a slider bar is possible if an upstanding lever is attached to the slider bar.

Slider bar 80 includes an upstanding lever member 90 as shown. End 92 of connecting rod 74 is linked to an aperture 94 in lever member 90. In this manner, rotation of crank wheel 70 drives slider bar 80 and lever member 90 rectilinearly in the slideway 82.

Preferably, connecting rod 74 is secured through apertures 72 and 94 by means of a bearing 96 and cotter pins 98. When connecting rod 74 is linked to a different crank wheel aperture, lever member 90 moves to the right or left of its usual position in the slideway. In order to keep lever member 90 centered in the slideway, a turnbuckle 100 is preferably included in connecting rod 74 such that the length of the connecting rod may be varied to compensate for the aperture change.

Lever member 90 includes a slot 102 sized to receive the shaft of a fishing rod 44 as best shown in FIGS. 1 and 4. Preferably, the slot cut in lever member 90 is wider at its base 104 as shown which tends to insure that the shaft of fishing rod 44 does not ride upwardly and out of slot 102.

As shown in FIGS. 1, 3 and 5, motor 66 is controlled by a switch 110 and any suitable speed control 112 which further controls the output of motor 66 which is translated through the speed control reducer means 64. The number of cycles per unit of time of the stroke imparted to the lever member and fishing rod held therewithin may be readily controlled by adjusting speed control 112.

In operation, trolling device 10 is positioned on gunwale 20 of a fishing boat and secured thereto by means of bolts 22 in slots 24 and threaded bolts 26. The motor is connected to a source of DC power, such as the boat's battery. A fishing rod 44 is inserted into rod butt holder 56 and in slot 102 of lever member 90. Switch 110 is turned on to energize the motor which causes the slider crank mechanism 60 to provide reciprocating rectilinear motion to lever member 90. The generally fixed support provided by rod holder 40 in combination with the oscillation of lever member 90 causes the tip of the fishing rod to move back and forth which provides a good trolling action. The number of strokes per unit of time may be varied by adjusting speed control 112. If a longer stroke length is required, connecting rod 74 is temporarily disconnected and connected to an aperture more remote from axle 68. When a fish strikes the tackle, the fisherman merely lifts the rod from slot 102 and from cup-shaped butt holder 56. In its most preferred form, the trolling device 10 includes an offset in rod holder 40 as shown in FIGS. 1 and 3 such that a reel 45 of a fishing rod 44 may depend downwardly without interfering with the rod holder.

The invention provides an effortless trolling device which, when used in conjunction with conventional fishing rods, simulates manual trolling while relieving the monotony or physical effort associated with the sport. The fisherman may release the rod from the trolling device at will when manual control is desired.

In considering this invention it must be remembered that this disclosure is illustrative only and that the scope of the invention is to be determined by the appended claims.

I claim:

1. A motor driven trolling device comprising:
   (a) a frame, including means for mounting said frame to a gunwale of a boat,
   (b) motor driven crank means for providing rotation to a crank, said means being mounted to said frame and including a motor means providing rotation to a crank of said crank means;
   (c) slider means journaled to said frame and being constructed and arranged such that a slider bar of said means may move back and forth in a straight line, said slider bar further including a lever means extending vertically from said slider bar, said lever means including a pivot link for attachment to a connecting rod pivotally linked to said crank means and lever means such that movement of said crank creates rectilinear movement of said slider bar, said lever means further including shaft holder means for releasably holding a shaft of a fishing rod thereto; and
   (d) fishing rod butt holder means for securing a butt end of a fishing rod to said butt holder means, said means including a rod holder detachably affixed at one end to said frame and having a fishing rod butt end receiving means at the other end such that a fishing rod may be held approximately perpendicularly to said slider bar by said butt end receiving means and shaft holder means so that rotation of said crank causes the free end of a fishing rod so held to move back and forth with said slider bar.

2. The trolling device of claim 1 wherein said crank includes a plurality of apertures spaced from the axis of rotation of said crank such that the stroke of the slider bar may be varied by attaching the connecting rod to a different aperture.

3. The trolling device of claim 2 wherein said connecting rod is constructed and arranged such that its length may be varied when the connecting rod is attached to a different crank aperture in order to maintain a balanced stroke path of said slider bar.

4. The trolling device of claim 2 wherein said crank is a wheel driven by said motor means.

5. The trolling device of claim 2 wherein said butt holder means comprises a holder including an end which attaches to said frame, a portion extending generally perpendicularly from said slider bar when attached to said frame, a fishing rod butt receiving end which securely holds a fishing rod butt end and said holder being constructed and arranged having an offset such that a reel depending from a fishing rod will not contact the perpendicular holder portion when said fishing rod is positioned therein.

6. A fish trolling device mountable to a boat for use with a fishing rod, said trolling device comprising:
   (a) frame means constructed and arranged to mount to a boat gunwale;
   (b) power driven slider means attached to said frame for providing rectilinear, reciprocating motion capable of moving a fishing rod for trolling, said slider means including a crank mechanism having a motor driven crank, said crank being pivotally connected to a connecting rod which in turn is pivotally connected to an upstanding lever member rigidly secured to a slider bar journaled to said frame so as to provide rectilinear motion;
   (c) fishing rod holding means for holding a fishing rod butt end to said frame, said means including a member detachably secured to said frame and extending generally perpendicularly therefrom, said member further including a fish rod butt attachment point at its free end such that a fishing rod butt may be inserted into said butt attachment point causing the fishing rod to extend over and generally perpendicular to said slider bar; and
   (d) said upstanding lever member of said slider means further including a slot into which the shaft of a fishing rod may be inserted such that a fishing rod would be held between the butt attachment point and slot, the rectilinear movement of said slider means and lever causing a free end of a fishing rod so positioned to move back and forth.

7. The fish trolling device of claim 6 wherein said slider bar is journaled to a slideway attached to said frame member.

8. The trolling device of claim 7 wherein said crank includes at least one aperture spaced from the axis of the crank to which the connecting rod may be pivotally attached thereto.

9. The trolling device of claim 8 wherein said crank is a wheel rotated by said motor and said wheel includes a plurality of apertures each spaced a different distance from the axis of the wheel such that the stroke of the slider bar may be varied by linking the connecting rod to different apertures in said wheel.

10. The trolling device of claim 9 wherein said connecting rod is constructed and arranged such that its length may be varied when it is linked to a different wheel aperture in order to maintain an even stroke to said slider bar.

11. The trolling device of claim 10 wherein said power driven slider means inlcudes means for manually adjusting the speed of the motor so as to provide control over the stroke cycle of the lever member.

* * * * *